(12) United States Patent
Conde Decimavilla et al.

(10) Patent No.: US 11,207,759 B2
(45) Date of Patent: Dec. 28, 2021

(54) DYNAMICALLY DAMPENED CENTERLESS GRINDING MACHINE TOOL AND GRINDING METHOD

(71) Applicant: IDEKO, S. COOP., Elgoibar (ES)

(72) Inventors: Luis Conde Decimavilla, Elgoibar (ES); Iker Mancisidor Aizpurua, Elgoibar (ES); Jokin Munoa Gorostidi, Elgoibar (ES)

(73) Assignee: IDEKO, S. COOP., Elgoibar (ES)

( * ) Notice: Subject to any disclaimer, the term of this patent is extended or adjusted under 35 U.S.C. 154(b) by 543 days.

(21) Appl. No.: 16/000,266

(22) Filed: Jun. 5, 2018

(65) Prior Publication Data
US 2018/0345451 A1 Dec. 6, 2018

(30) Foreign Application Priority Data
Jun. 5, 2017 (EP) .................................... 17382336

(51) Int. Cl.
| | | |
|---|---|---|
| *B24B 41/00* | (2006.01) | |
| *B24B 5/18* | (2006.01) | |
| *B23Q 1/54* | (2006.01) | |
| *B23Q 11/00* | (2006.01) | |
| *B24B 49/00* | (2012.01) | |
| *B24B 49/10* | (2006.01) | |

(52) U.S. Cl.
CPC .............. *B24B 41/007* (2013.01); *B23Q 1/54* (2013.01); *B23Q 11/0035* (2013.01); *B24B 5/18* (2013.01); *B24B 49/00* (2013.01); *B24B 49/10* (2013.01); *B23Q 2220/006* (2013.01)

(58) Field of Classification Search
CPC .... B24B 5/18; B24B 5/22; B24B 5/04; B24B 41/007; B24B 49/00; B24B 49/10; B24B 51/00; B23Q 1/54; B23Q 11/0035; B23D 47/005

USPC ................ 451/5, 49, 51, 209, 231, 242, 243
See application file for complete search history.

(56) References Cited

U.S. PATENT DOCUMENTS

| | | | | |
|---|---|---|---|---|
| 1,733,086 A | | 10/1929 | Sobolewski | |
| 3,967,515 A | * | 7/1976 | Nachtigal | B23Q 15/12 82/118 |
| 5,070,655 A | * | 12/1991 | Aggarwal | G05B 19/4063 451/5 |

(Continued)

FOREIGN PATENT DOCUMENTS

| | | | | |
|---|---|---|---|---|
| ES | 2425994 A1 | * | 10/2013 | ............... B23Q 1/54 |
| ES | 2425994 A1 | | 10/2013 | |

(Continued)

OTHER PUBLICATIONS

European Search Report dated Nov. 24, 2017 for corresponding European Priority Document 17382336.

*Primary Examiner* — Orlando E Aviles
*Assistant Examiner* — Robert F Neibaur
(74) *Attorney, Agent, or Firm* — Lucas & Mercanti, LLP

(57) ABSTRACT

The invention relates to a dynamically dampened centerless grinding machine tool comprising wheels between which there is arranged a part to be ground, heads for carrying the wheels, at least one translation means for translating one of the heads to cause a movement according to a separation and approach direction of the wheels, detection means for detecting a vibration of at least one of the heads, and at least one damper configured for causing a vibration damping movement.

9 Claims, 3 Drawing Sheets

(56) References Cited

U.S. PATENT DOCUMENTS

| | | | |
|---|---|---|---|
| 5,558,567 A * | 9/1996 | Hedberg | B23Q 1/017 451/242 |
| 6,200,204 B1 * | 3/2001 | Helgren | B23Q 11/0032 451/124 |
| 6,729,938 B2 * | 5/2004 | Ikeda | B23Q 1/015 451/14 |
| 7,677,954 B2 * | 3/2010 | Hall | B24B 49/16 451/8 |
| 9,694,462 B2 * | 7/2017 | Otto | B24B 5/30 |
| 10,543,580 B2 * | 1/2020 | Watanabe | B24B 5/04 |

FOREIGN PATENT DOCUMENTS

| | | |
|---|---|---|
| GB | 107292 | 8/1916 |
| JP | 2002254303 A | 9/2002 |
| JP | 2005199410 A | 7/2005 |

* cited by examiner

DYNAMICALLY DAMPENED CENTERLESS GRINDING MACHINE TOOL AND GRINDING METHOD

CROSS REFERENCE TO RELATED APPLICATION

This application claims the benefit of priority from European Patent Application No. 17382336.0 filed Jun. 5, 2017, which is incorporated herein by reference.

FIELD OF THE ART

The present invention relates to centerless grinding machines for grinding cylindrical parts, proposing a centerless grinding machine and a grinding method that allows attenuating vibrations induced in the machine due to the grinding process.

STATE OF THE ART

Centerless grinding is a widely used machining process to produce precise cylindrical parts together with high production ratios, which is primarily achieved by eliminating the operations for centering and anchoring the part to be ground, which entails a considerable reduction in operation times and the possibility of automating the grinding process.

Grinding is performed in grinding machines with a basic setup comprising two heads carrying wheels between which there is arranged the part to be ground, commonly referred to as grinding wheel and regulating wheel, holding means for holding the part, commonly referred to as the blade, and at least one translation means for translating one of the heads, which allows adapting the relative position of the wheels as needed, according to a separation and approach movement of the wheels. For example, patent documents GB107292 and US1733086, filed in 1916 and 1921, respectively, disclose centerless grinding machines with the basic setup described above.

Maintaining the basic setup, there are grinding machines having one translation means per wheel, where the wheels can move according to the separation and approach movement thereof, and additionally according to a transverse movement with respect to the part, or even furthermore according to a rotational movement that modifies the angle of incidence between the wheel and the part.

Despite the fact that the basic setup of a centerless grinder has not experienced any substantial changes with respect to the earliest designs that were conceived, such as those described in GB107292 and US1733086, said basic setup has drawbacks due to the occurrence of vibrations while grinding parts. These vibrations generate instability in the grinding process causing a poor surface finish of the parts and significant wear of the wheels, in addition to being one of the main factors involved in generating stress in the members of the machine.

The mechanical structure of the grinding machine tends to vibrate during grinding operations. There are primarily two critical vibration modes which correspond with the head opening modes, i.e., there is a relative movement for moving of the head carrying the wheel and the part closer to/farther away from one another, in the direction in which the wheel applies pressure on the part. So when the wheel presses against the part a vibration is generated which causes the head to bend according to the direction of rotation of the wheel. Although these are the two main vibration modes of the machine, there may be other vibration modes causing a relative vibratory movement between the two wheels, for example twisting of the head could be another critical vibration mode.

To dampen or eliminate these unwanted vibrations produced during grinding, techniques are known consisting of changing the grinding parameters when the occurrence of vibrations is detected. To that end, the vibration of the mechanical structure of the machine during grinding is controlled by means of sensors, such as accelerometers, for example, such that when the occurrence of vibrations is detected, the grinding parameters are manually modified by, for example, changing the forward movement speed of the translation means, or the rotational speed of the wheels. Although this solution allows correcting the occurrence of vibrations, it generally makes it necessary to reduce the speed, thereby affecting machine productivity. Furthermore, this solution is a corrective method which makes it necessary to evaluate the behavior of the machine for each grinding operation and modify the grinding parameters according to the occurrence of vibrations. There are other solutions in which the vibration is not detected by using sensors, but rather by the operator who modifies grinding parameters of the machine based on experience in order to prevent vibrations from occurring, which results in a rather ineffective method that is subject to human error.

Other known solutions are based on using elastomers between a fixed portion and the portion of the structure of the machine that is subjected to vibrations, such that the elastomer absorbs the vibrations. Other solutions are based on modifying the drive members of the machine by modifying the rigidity thereof. In any case, they are all expensive solutions that do not allow attenuating all the vibrations that occur.

A solution is therefore needed to solve the drawbacks indicated above, which allows attenuating or eliminating, in real time and in an efficient manner, vibrations occurring in the grinding machine while grinding parts.

OBJECT OF THE INVENTION

The object of the present invention is a centerless grinding machine tool with an improved setup which allows attenuating or eliminating, in real time, vibrations occurring in the grinding machine during machining.

The dynamically dampened centerless grinding machine tool of the invention comprises:
  wheels between which there is arranged a part to be ground,
  heads for carrying the wheels,
  at least one translation means for translating one of the heads to cause a movement according to a separation and approach direction between the wheels,
  detection means for detecting a vibration of at least one of the heads, and
  at least one damper configured for causing a vibration damping movement.

With this embodiment, the detection means allow detecting the occurrence of vibrations in the heads during machining, and the damping movement required for attenuating vibrations can be introduced by means of the damper. Vibrations occurring in the grinding machine while grinding parts are thereby attenuated or eliminated in real time and in an efficient manner.

There are preferably two dampers, one for each of the heads, one of the dampers being configured for causing the vibration damping movement of one of the heads, and the other one of the dampers being configured for causing the vibration damping movement of the other one of the heads. Preferably, there are also two detection means, one of the detection means being configured for detecting the vibration of one of the heads, and the other one of the detection means being configured for detecting the vibration of the other one of the heads. One pair of detection means and damper per head is therefore used, the damping of the vibrations occurring in the machine thereby being more effective.

The damper is configured for generating the damping movement such that it is opposite the vibration.

The damper is preferably configured for generating the damping movement in the separation and approach direction between the wheels.

The damper comprises a moving mass and an actuator configured for moving the moving mass. The actuator therefore introduces a force in the moving mass which is a function of the signal detected by the detection means, wherein said force is introduced such that it is opposite the vibration and directed in the separation and approach direction between the wheels.

The damper is preferably arranged on an upper face of the head. The damper is even more preferably arranged in the center of the upper face of the head. The damper is even more preferably arranged in the center of the upper face at an end that is closest to the part to be ground.

The detection means detecting the vibration of one of the heads and the damper causing the vibration damping movement are preferably arranged in the same head. Therefore action is taken at the same point in which the vibration of the heads is detected, thereby assuring that the phase of the force that is introduced is such that it is opposite the vibration in all the vibration modes that may occur.

According to foregoing, the grinding method for attenuating vibrations occurring while grinding parts comprises the steps of:
arranging the detection means and the damper in the centerless grinding machine tool,
detecting a vibration of at least one head of the machine using the detection means, and
causing a vibration damping movement by means of the damper.

A centerless grinding machine is thereby obtained, which machine allows attenuating or eliminating, in real time, vibrations occurring during machining in a simplified manner and with a minimal change to the setup.

DETAILED DESCRIPTION OF THE INVENTION

Figure 1:
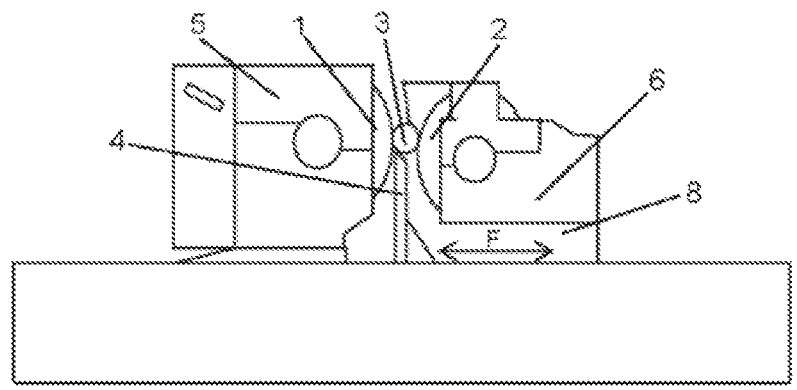
FIG. 1 shows a centerless grinding machine tool with a basic setup according to the state of the art.

FIG. 1 shows a centerless grinding machine with a basic setup according to the prior art. The grinding machine comprises two wheels (1, 2), a grinding wheel (1) and a regulating wheel (2), between which there is arranged a part (3) to be ground supported on holding means (4). Each wheel (1, 2) is arranged in a head (5, 6), wherein at least one of the heads (5, 6) is arranged on translation means (8), such that by means of the movement of the translation means (8) a separation and approach movement of the wheels (1, 2) occurs. Said movement occurs in the direction depicted in the drawings by means of the arrow (F) and is perpendicular to the blade (4) and therefore to the longitudinal axis of the part (3).

Accordingly, in operation the regulating wheel (2) is taken by the translation means (8), applying pressure on the part (3) in the direction of movement of the translation means (8), depicted by the arrow (F), such that the part (3) is retained between the wheels (1, 2), being supported such that it freely rotates on the holding means (4), so the part (3) is ground by means of the rotation of the wheels (1, 2).

Figure 2:
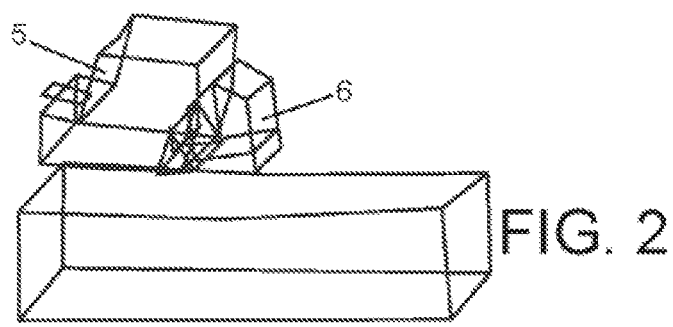
FIGS. 2 and 3 show a schematic view of the two main vibration modes of a centerless grinding machine tool, such as that depicted in FIG. 1.
Figure 3:
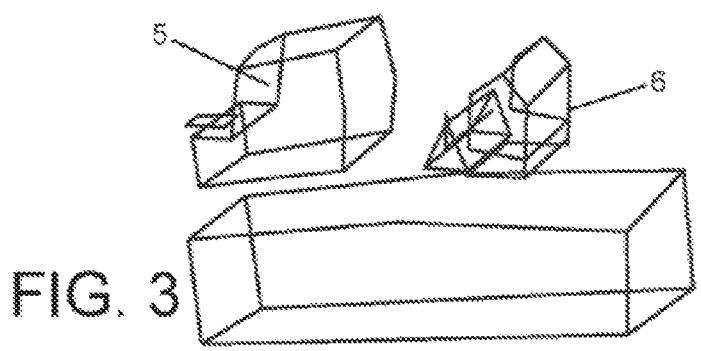

Grinding creates forces which cause the excitation of the vibration modes of the different components of the machine, such as the heads (5, 6), which generates vibrations that are transmitted to the machining point located in the contact area between the part (3) and the wheels (1, 2). This causes geometric defects or excessive wear of the machining tool, or a poor surface finish of the part (3), among other factors. As can be seen in FIGS. 2 and 3, the centerless grinding machine has two main vibration modes which cause the heads (5, 6) to bend, resulting in them moving farther away or closer, depending on the direction of rotation of the wheels (1, 2).

According to the invention, a centerless grinding machine is proposed which allows detecting vibrations occurring in the contact area between the part (3) and the wheels (1, 2) acting on them to suppress them, such that the surface finish of the parts is improved, machine productivity increased and the life of its components prolonged.

According to the foregoing, the invention proposes a machine tool such as the one described in FIG. 1 and which additionally comprises detection means (9) for detecting a vibration of at least one of the heads (5, 6) and at least one damper (10) configured for causing a vibration damping movement for damping the detected vibration.

The detection means (9) and the damper (10) are preferably arranged in one and the same head (5, 6). In other words, the detection means (9) and the damper (10) are located in approximately the same point, such that action is taken at the same point in which the occurrence of the vibration is detected. The phase of the force introduced by the damper (10) is thereby assured to be such that it is opposite the vibration in all the vibration modes that may occur.

Furthermore, since the damper (10) is arranged in the head (5, 6), action is taken near the source of the vibration, i.e., the contact point between part (3) and the wheels (1, 2), and furthermore action is taken directly on the head (5, 6) itself, which is the member of the machine that is directly exposed to the vibration, since it is the member carrying the wheels (1, 2).

Figure 4:
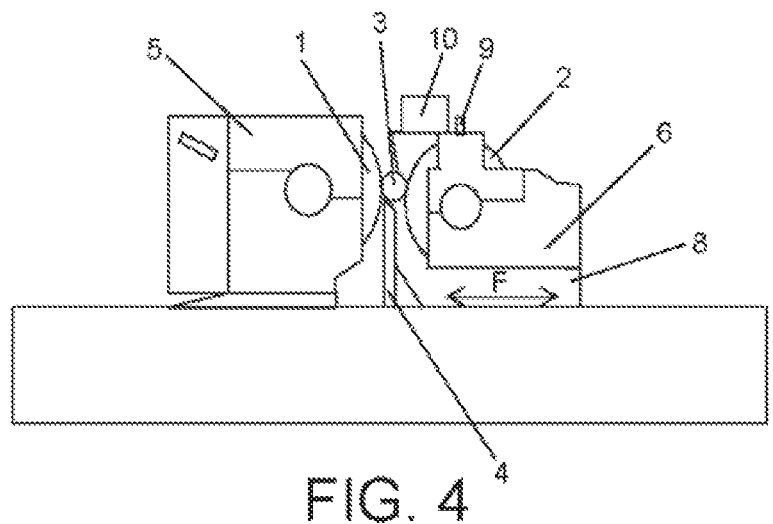
FIG. 4 shows a first embodiment of a centerless grinding machine tool according to the invention with a stationary head and another head arranged in translation means.

As shown in the embodiment of FIG. 4, the machine has the detection means (9) and the damper (10) arranged in the head (6) which is arranged on the translation means (8), although the detection means (9) and the damper (10) could be arranged in the head (5) which is fixed to the frame of the machine.

Alternatively, the machine depicted in the embodiment of FIG. 4 can have two detection means (9) and two dampers (10), such that the first detection means (9) and the first damper (10) are arranged in the head (5) of the first wheel (1), the grinding wheel (1), and the second detection means (9) and the first damper (10) are arranged in the head (6) of the second wheel (2), the regulating wheel (2), which is arranged on the translation means (8).

In any case, although the detection means (9) and the damper (10) are preferably arranged in one and the same head (5, 6); this option is not a limiting option, as it is possible for the detection means (9) and the damper (10) to be arranged at other points of the machine. For example, the detection means (9) could be arranged in the head (6) which is mounted on the translation means (8), and the damper (10) could be arranged on the translation means (8); nevertheless, in that case a greater force would be required to dampen the vibration, since action would be taken at a point farther away from the source of the vibrations, and additionally the damping would be less efficient since action would be taken at a point other than the point where measurement would be taken.

Figure 5:
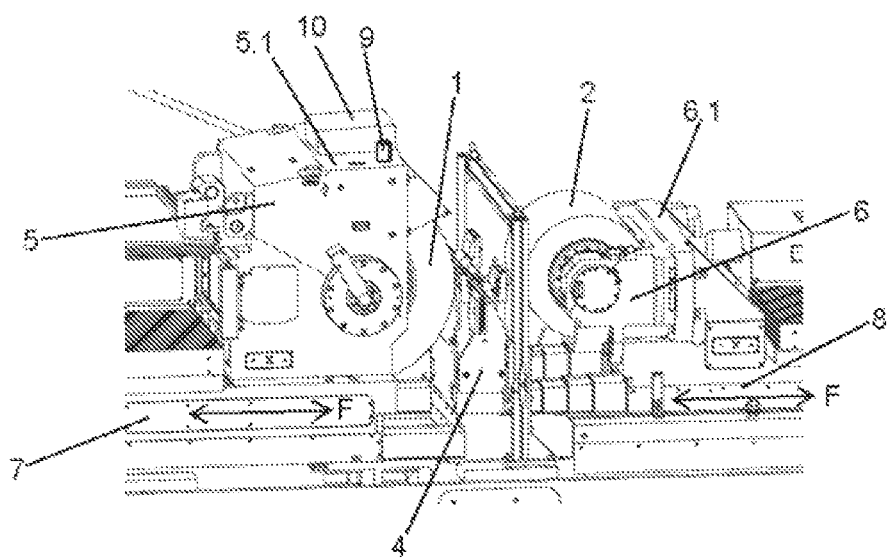
FIG. 5 shows a second embodiment of a centerless grinding machine tool according to the invention with both heads arranged in respective translation means, wherein the damper is arranged in the head of the regulating wheel.
Figure 6:
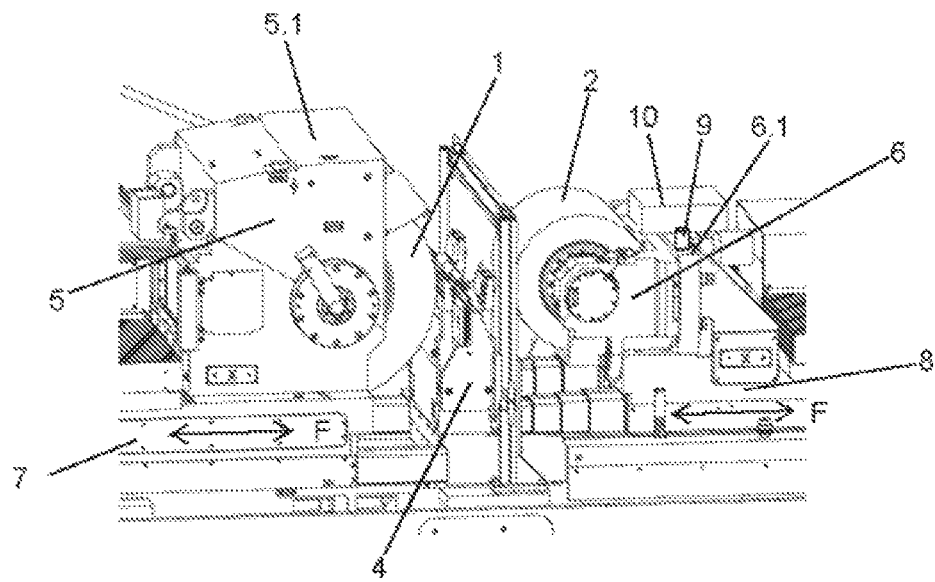
FIG. 6 shows the machine of the second embodiment with the damper arranged in the head of the grinding wheel.
Figure 7:
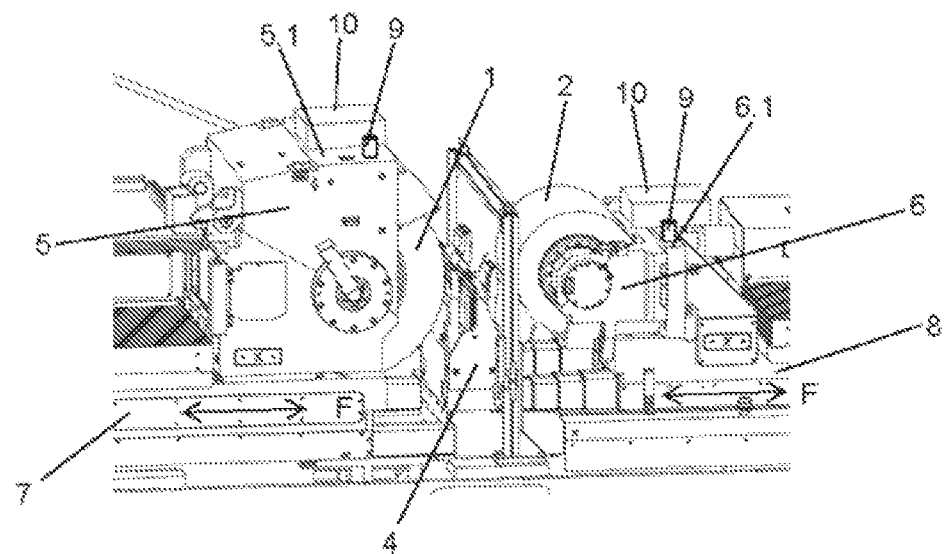
FIG. 7 shows the machine of the second embodiment with a damper arranged in each head of the machine.

FIGS. 5 to 7 show a second embodiment of the invention, which is identical to the first embodiment with the difference being the existence of two translation means (7, 8), one for each of the wheels (1, 2), a first translation means (7) of the first wheel (1), and a second translation means (8) of the second wheel (2). Both translation means (7, 8) move the heads (5, 6) in the direction depicted in the drawings by means of the arrow (F), which is perpendicular to the blade (4) and therefore to the longitudinal axis of the part (3).

FIG. 5 shows a centerless grinding machine according to the second embodiment of the invention with the detection means (9) and the damper (10) arranged in the first head (5) of the first translation means (7).

FIG. 6 shows a centerless grinding machine according to the second embodiment of the invention with the detection means (9) and the damper (10) arranged in the second head (6) of the second translation means (8).

FIG. 7 shows a centerless grinding machine according to the second embodiment of the invention with first detection means (9) and a first damper (10) arranged in the first head (5) of the first translation means (7) and with second detection means (9) and a second damper (10) arranged in the second head (6) of the second translation means (8). Better attenuation of the vibrations is achieved with this embodiment, because since the wheels (1, 2) are in contact through the part (3) during grinding, vibrations are transmitted to both heads (5, 6), whereby the arrangement of one pair of detection means (9) and damper (10) per head (5, 6) to dampen vibrations occurring in both heads (1, 2) is advantageous.

The damper (10) is an active damper comprising a moving mass and an actuator of the moving mass, such that it is coupled to a head (5, 6) in order to introduce therein a controlled force which is a function of the amplitude of the signal obtained by the detection means (9).

The damper (10) has been envisaged to be a hydraulic, piezoelectric, or electromagnetic device, a linear motor or any other means suitable for introducing a controlled force.

The damper (10) is preferably configured for generating the damping movement that is opposite the vibration.

The damper (10) is preferably a one-way damper generating the damping movement in the direction of movement of the translation means (7, 8) depicted by the arrow (F). In other words, grinding causes a vibration in the direction in which the wheel (1, 2) applies pressure on the part (3) according to a relative movement for moving the translation means (5, 6) and the part (3) closer to/farther away from one another, such that the damper (10) generates a damping movement in said direction.

Alternatively, the damper (10) is a two-way damper generating a first damping movement in the direction of movement of the translation means (7, 8), depicted by the arrow (F) in the drawings, and optionally a second damping movement in a direction perpendicular to the direction of movement of the translation means (7, 8) and parallel to the longitudinal axis of the part (3).

The detection means (9) are preferably an accelerometer that measures the frequency and amplitude at which the head (5, 6) in which the accelerometer is arranged oscillates due to the machining process.

Use of a passive damper comprising a moving mass but not an actuator of said moving mass would be possible in order to dampen vibration; however, the high value of the modal mass of the critical modes of the grinding machine makes the inertial mass to be introduced very large, so a passive damper with a very large moving mass would be required, and a lot more space would be required for arranging it. However, by using an active damper such as the one proposed by the invention, a smaller moving mass is required since a controlled force is applied on the moving mass according to the information sent by the detection means (9).

The damper (10) is preferably arranged on an upper face (5.1, 6.1) of the head (5, 6), which is opposite the lower face where the head (5, 6) is attached to the translation means (7, 8), or where appropriate to the frame of the machine. Action is thereby taken on the area of the head (5, 6) that oscillates the most when vibrations occur.

The damper (10) is even more preferably arranged in the center of the upper face (5.1, 6.1) of the head (5, 6), and even more preferably at an end of the upper face (5.1, 6.1) which is closest to the holding means (4) for holding the part (3), such that action is taken at the point of the head (5, 6) that is closest to the point of origin of the vibrations.

A grinding method is thereby obtained, comprising the steps of arranging detection means (9) and a damper (10) in a centerless grinding machine tool, detecting a vibration of at least one head (5, 6) of the machine using the detection means (9), and causing a vibration damping movement by means of the damper (10).

The detection means (9) allow knowing the frequency and amplitude at which the head (5, 6) vibrates in real time such that the frequency and force to be introduced by the damper (10) to suppress vibration can be adjusted, thereby assuring that vibrations will not occur during the operation for grinding the part (3).

The invention claimed is:

1. A dynamically dampened centerless grinding machine tool comprising:
    a grinding wheel and a control wheel between which there is arranged a part to be ground;
    two heads for carrying the wheels;
    at least one translation means for translating one of the heads to cause a movement according to a separation and approach direction in a longitudinal direction of the wheels;
    detection means for detecting a vibration of at least one of the heads;
    at least one damper configured for causing a vibration damping movement,
    wherein the at least one damper is on top of an uppermost surface of one of the two heads, the damper comprising a moving mass and an actuator configured to move the moving mass in the separation and approach direction in the longitudinal direction of the wheels.

2. The dynamically dampened centerless grinding machine tool according to claim 1, wherein there are two dampers, one for each of the heads, one of the dampers being configured for causing the vibration damping movement of one of the heads, and the other one of the dampers being configured for causing the vibration damping movement of the other one of the heads.

3. The dynamically dampened centerless grinding machine tool according to claim 1, wherein there are two detection means, one of the detection means being configured for detecting the vibration of one of the heads, and the other one of the detection means being configured for detecting the vibration of the other one of the heads.

4. The dynamically dampened centerless grinding machine tool according to claim 1, wherein the at least one damper is configured for generating the damping movement that is opposite the vibration, as detected by the detecting means.

5. The dynamically dampened centerless grinding machine tool according to claim 1, wherein the at least one damper is configured for generating the damping movement in the separation and approach in the longitudinal direction of the wheels.

6. The dynamically dampened centerless grinding machine tool according to claim 1, wherein the damper is arranged in the center of the uppermost surface of the head.

7. The dynamically dampened centerless grinding machine tool according to claim 6, wherein the damper is arranged at an end of the uppermost surface that is closest to a holding means for holding the part.

8. The dynamically dampened centerless grinding machine tool according to claim 1, wherein the detection means detecting the vibration of one of the heads and the damper causing the vibration damping movement are arranged in the same head.

9. A grinding method comprising the dynamically dampened centerless grinding machine tool according to claim 1, comprising the steps of: arranging the detection means and the damper in the centerless grinding machine tool; detecting the vibration of at least one head of the machine using the detection means; and causing the vibration damping movement by means of the damper.

\* \* \* \* \*